(12) United States Patent
Procopio

(10) Patent No.: US 8,458,195 B1
(45) Date of Patent: *Jun. 4, 2013

(54) SYSTEM AND METHOD FOR DETERMINING SIMILAR USERS

(75) Inventor: Michael Jeffrey Procopio, Boulder, CO (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/363,195

(22) Filed: Jan. 31, 2012

(51) Int. Cl.
*G06F 17/30* (2006.01)

(52) U.S. Cl.
USPC .......................................................... 707/749

(58) Field of Classification Search
USPC ........................................ 707/706, 723, 749
See application file for complete search history.

(56) References Cited

U.S. PATENT DOCUMENTS

| | | | |
|---|---|---|---|
| 5,963,940 A | 10/1999 | Liddy et al. | |
| 6,236,987 B1 | 5/2001 | Horowitz et al. | |
| 6,349,307 B1 | 2/2002 | Chen | |
| 7,065,532 B2 | 6/2006 | Elder et al. | |
| 7,080,082 B2 | 7/2006 | Elder et al. | |
| 7,103,609 B2 | 9/2006 | Elder et al. | |
| 7,130,844 B2 | 10/2006 | Elder et al. | |
| 7,249,123 B2 | 7/2007 | Elder et al. | |
| 7,257,569 B2 | 8/2007 | Elder et al. | |
| 7,765,212 B2 | 7/2010 | Surendran et al. | |
| 7,853,594 B2 | 12/2010 | Elder et al. | |
| 7,860,811 B2 * | 12/2010 | Flinn et al. ...................... | 706/11 |
| 2004/0088315 A1 | 5/2004 | Elder et al. | |
| 2004/0088322 A1 | 5/2004 | Elder et al. | |
| 2004/0088649 A1 | 5/2004 | Elder et al. | |
| 2004/0254911 A1 * | 12/2004 | Grasso et al. ..................... | 707/1 |
| 2005/0198044 A1 * | 9/2005 | Kato et al. ..................... | 707/100 |
| 2006/0195461 A1 | 8/2006 | Lo et al. | |
| 2007/0078889 A1 | 4/2007 | Hoskinson | |
| 2007/0150470 A1 * | 6/2007 | Brave et al. ..................... | 707/6 |
| 2009/0287682 A1 | 11/2009 | Fujioka et al. | |
| 2009/0319907 A1 * | 12/2009 | Tokuda .......................... | 715/739 |
| 2011/0016121 A1 * | 1/2011 | Sambrani et al. ............. | 707/734 |
| 2011/0113040 A1 * | 5/2011 | Bickel et al. .................. | 707/749 |
| 2011/0145719 A1 * | 6/2011 | Chen et al. .................... | 715/739 |
| 2011/0258229 A1 | 10/2011 | Ni et al. | |
| 2012/0136812 A1 * | 5/2012 | Brdiczka ........................ | 706/12 |
| 2012/0173561 A1 * | 7/2012 | Kim et al. ..................... | 707/767 |

OTHER PUBLICATIONS

James Allan, "Topic Detection and Tracking-Event-Based Information Organization," 2002, Kluwer Academic Publishers, Norwell, Massachusetts, USA; http://books.google.com/books?hl=en&lr=&id=50hnLl_Jz3cC&oi=fnd&pg=PR9&dq=topic+detection+and+tracking+event-based+information+organization&ots=nfu5nDwUa0&sig=U2lTFv2_AMnciqo9J8WLaS9lv98#v=onepage&d=topic%20detection%20and%20tracking%20event-based%20inform&f=false (last visited on Jan. 31, 2012).

(Continued)

*Primary Examiner* — Cam-Linh Nguyen
(74) *Attorney, Agent, or Firm* — Young, Basile, Hanlon & MacFarlane, P.C.

(57) ABSTRACT

A method and system for determining similar users may include receiving information for a source user, the information including at least one topic and a user value for each topic, where the value represents how strongly the user is associated with that topic. Similarity scores may be generated based on a value for each topic for the source user and a value for the same topic for each user in a set of users, where each user in the set of users is associated with a value for each topic. One or more similar users may be selected based on the generated similarity scores, and one or more of the selected users may be output.

20 Claims, 5 Drawing Sheets

OTHER PUBLICATIONS

Stefan Siersdorfer and Sergej Sizov, "Automatic Document Organization in a P2P Environment," 2006, Springer, Berlin, Germany; http://www.springerlink.com/content/27140h768278629r/ (last visited on Jan. 31, 2012).

Dr. E. Garcia, "Cosine Similarity and Term Weight Tutorial," http://www.miislita.com/information-retrieval-tutuorial/cosine-similarity-tutorial.html (last visited on Jan. 30, 2012).

U.S. Appl. No. 13/363,024, filed Jan. 31, 2012, Procopio, et al.
U.S. Appl. No. 13/363,067, filed Jan. 31, 2012, Procopio, et al.
U.S. Appl. No. 13/363,152, filed Jan. 31, 2012, Procopio.
U.S. Appl. No. 13/363,126, filed Jan. 31, 2012, Procopio.
U.S. Appl. No. 13/363,094, filed Jan. 31, 2012, Procopio, et al.
U.S. Appl. No. 13/363,210, filed Jan. 31, 2012, Procopio.
U.S. Appl. No. 13/363,169, filed Jan. 31, 2012, Procopio.
U.S. Appl. No. 13/363,221, filed Jan. 31, 2012, Procopio.
U.S. Office Action, mailed on Nov. 21, 2012, in the related U.S. Appl. No. 13/363,169.

* cited by examiner

200

USER X - USER SIGNATURE

| TOPIC | USER VALUE | NORMALIZED VALUE |
|---|---|---|
| A | 0.4 | 0.2 |
| B | 1.0 | 0.5 |
| C | 0.6 | 0.3 |

USER Y - USER SIGNATURE

| TOPIC | USER VALUE | NORMALIZED VALUE |
|---|---|---|
| B | 1.2 | 0.6 |
| C | 0.6 | 0.3 |
| D | 0.2 | 0.1 |

USER Z - USER SIGNATURE

| TOPIC | USER VALUE | NORMALIZED VALUE |
|---|---|---|
| B | 1.25 | 0.5 |
| D | 0.25 | 0.1 |
| E | 1.0 | 0.4 |

*FIG. 2*

SIMILARITY COMPUTATION FOR SOURCE USER
(E.G., USER X) WITH SIGNATURE [0.2, 0.5, 0.3, 0.0, 0.0, 0.0]

300

| USER (n) | SIMILARITY SCORE (SOURCE USER V. USER (n)) | TOP N | SIMILAR/NOT SIMILAR FIXED (e.g., 0.5) | AUTOMATIC (e.g., 0.75) |
|---|---|---|---|---|
| USER Y | $\frac{[0.2, 0.5, 0.3, 0.0, 0.0, 0.0] \cdot [0.0, 0.6, 0.3, 0.1, 0.0]}{\|[0.2, 0.5, 0.3, 0.0, 0.0, 0.0]\| \|[0.0, 0.6, 0.3, 0.1, 0.0]\|} = 0.93$ | YES | YES | YES |
| USER Z | $\frac{[0.2, 0.5, 0.3, 0.0, 0.0, 0.0] \cdot [0.0, 0.5, 0.0, 0.1, 0.4]}{\|[0.2, 0.5, 0.3, 0.0, 0.0, 0.0]\| \|[0.0, 0.5, 0.0, 0.1, 0.4]\|} = 0.63$ | NO | YES | NO |

| TOPIC | DEGREE OF OVERLAP (CONTRIBUTION) | OUTPUT / NOT OUTPUT | | |
|---|---|---|---|---|
| | | TOP N | FIXED (E.G., 0.25) | AUTOMATIC (E.G., 0.05) |
| A | 0.0 | NOT OUTPUT | NOT OUTPUT | NOT OUTPUT |
| B | 0.3 | OUTPUT | OUTPUT | OUTPUT |
| C | 0.09 | NOT OUTPUT | NOT OUTPUT | OUTPUT |
| D | 0.0 | NOT OUTPUT | NOT OUTPUT | NOT OUTPUT |
| E | 0.0 | NOT OUTPUT | NOT OUTPUT | NOT OUTPUT |

FIG. 4

SYSTEM AND METHOD FOR DETERMINING SIMILAR USERS

CROSS REFERENCES TO RELATED APPLICATIONS

The following U.S. patent applications are filed concurrently herewith and are assigned to the same assignee hereof and contain subject matter related, in certain respect, to the subject matter of the present application. These patent applications are incorporated herein by reference.

Ser. No. 13/363,067 is now pending, filed Jan. 31, 2012 for "SYSTEM AND METHOD FOR INDEXING DOCUMENTS";

Ser. No. 13/363,024 is now pending, filed Jan. 31, 2012 for "SYSTEM AND METHOD FOR COMPUTATION OF DOCUMENT SIMILARITY";

Ser. No. 13/363,152 is now pending, filed Jan. 31, 2012 for "SYSTEM AND METHOD FOR CONTENT-BASED DOCUMENT ORGANIZATION AND FILING";

Ser. No. 13/363,126 is now pending, filed Jan. 31, 2012 for "SYSTEM AND METHOD FOR DETERMINING ACTIVE TOPICS";

Ser. No. 13/363,094 is now pending, filed Jan. 31, 2012 for "SYSTEM AND METHOD FOR AUTOMATICALLY DETERMINING DOCUMENT CONTENT";

Ser. No. 13/363,210 is now pending, filed Jan. 31, 2012 for "SYSTEM AND METHOD FOR DETERMINING TOPIC AUTHORITY";

Ser. No. 13/363,169 is now pending, filed Jan. 31, 2012 for "SYSTEM AND METHOD FOR DETERMINING TOPIC INTEREST"; and Ser. No. 13/363,221 is now pending, filed Jan. 31, 2012 for "SYSTEM AND METHOD FOR DETERMINING SIMILAR TOPICS."

BACKGROUND

Many different users may interact with information and data stored in databases. Users may, for example, interact with one or more documents including content related to one or more topics. It may desirable to determine and/or identify similar users.

SUMMARY

Briefly, aspects of the present disclosure are directed to methods and systems for determining similar users, which may include receiving information for a source user, the information including at least one topic and a user value for each topic, where the value represents how strongly the user is associated with that topic. Similarity scores may be generated based on a value for each topic for the source user and a value for the same topic for each user in a set of users, where each user in the set of users is associated with a value for each topic. One or more similar users may be selected based on the generated similarity scores, and one or more of the selected users may be output.

This SUMMARY is provided to briefly identify some aspects of the present disclosure that are further described below in the DESCRIPTION. This SUMMARY is not intended to identify key or essential features of the present disclosure nor is it intended to limit the scope of any claims.

The term "aspects" is to be read as "at least one aspect". The aspects described above and other aspects of the present disclosure described herein are illustrated by way of example(s) and not limited in the accompanying figures.

BRIEF DESCRIPTION OF THE DRAWINGS

A more complete understanding of the present disclosure may be realized by reference to the accompanying figures in which:

FIG. 2 is a diagram of user signatures according to aspects of the present disclosure;

FIG. 3 is a diagram of similarity scores for a user according to aspects of the present disclosure;

FIG. 4 is a diagram of topic overlap between users according to aspects of the present disclosure.

Figure 1:
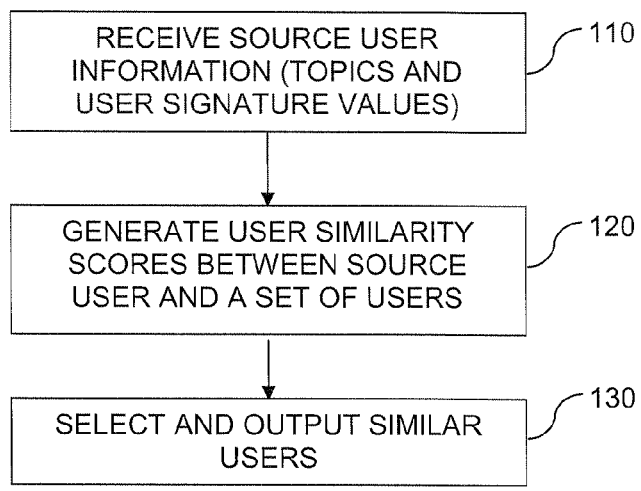
FIG. 1 is a flowchart of a method according to aspects of the present disclosure.

The illustrative aspects are described more fully by the Figures and detailed description. The present disclosure may, however, be embodied in various forms and is not limited to specific aspects described in the Figures and detailed description.

DESCRIPTION

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions.

Moreover, all statements herein reciting principles and aspects of the disclosure, as well as specific examples thereof, are intended to encompass both structural and functional equivalents thereof. Additionally, it is intended that such equivalents include both currently known equivalents as well as equivalents developed in the future, e.g., any elements developed that perform the same function, regardless of structure.

Thus, for example, it will be appreciated by those skilled in the art that any block diagrams herein represent conceptual views of illustrative circuitry embodying the principles of the disclosure. Similarly, it will be appreciated that any flow charts, flow diagrams, state transition diagrams, pseudocode, and the like represent various processes which may be substantially represented in computer readable medium and so executed by a computer or processor, whether or not such computer or processor is explicitly shown.

The functions of the various elements shown in the Figures, including any functional blocks labeled as "processors", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and nonvolatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

Unless otherwise explicitly specified herein, the drawings are not drawn to scale.

Figure 5:
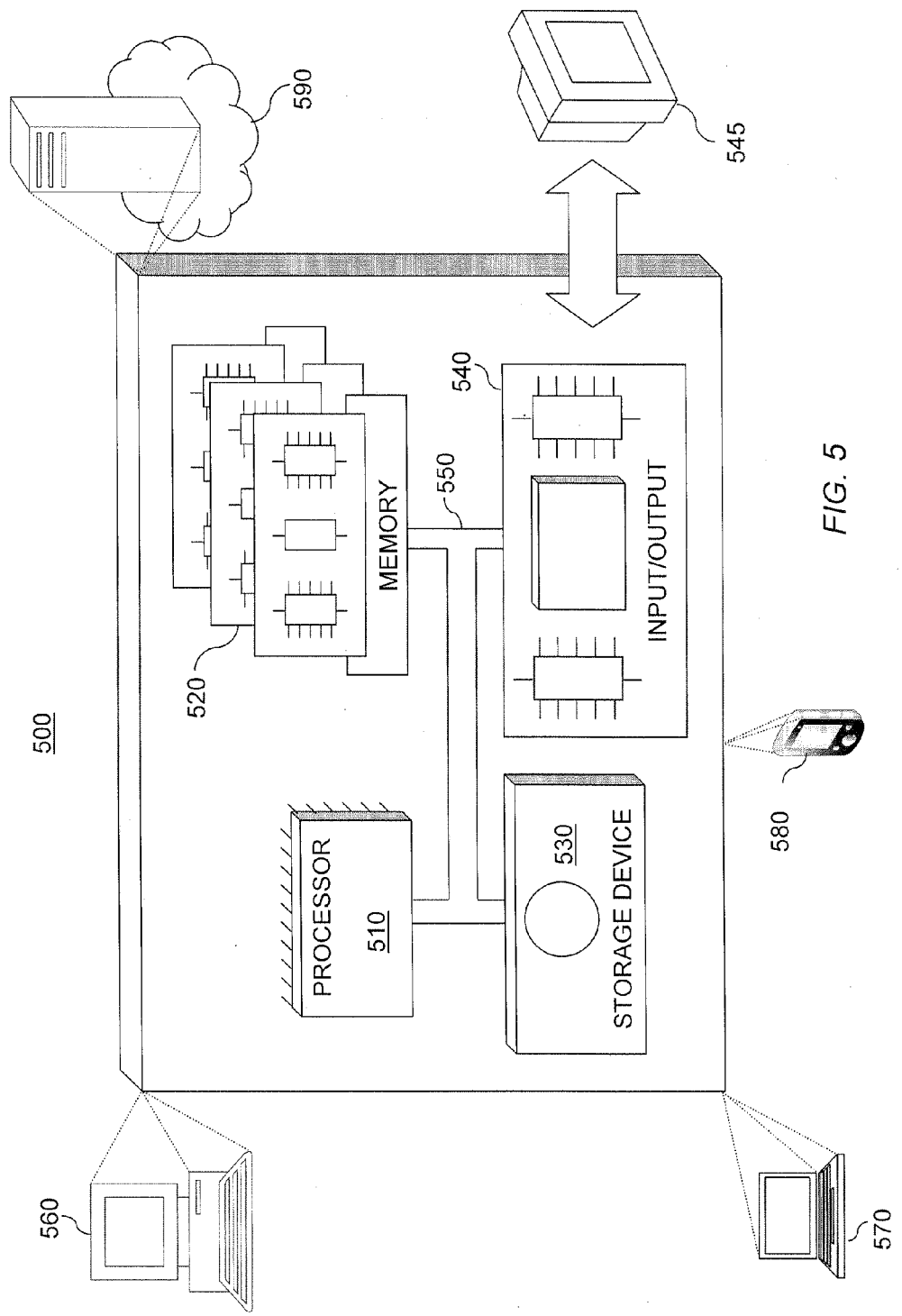
FIG. 5 is a schematic diagram depicting a representative computer system for implementing and exemplary methods and systems for determining similar users according to aspects of the present disclosure.

In FIG. 1, there is shown a flow diagram 100, which defines steps of a method according to aspects of the present disclosure. Methods and systems of the present disclosure may be implemented using, for example, a computer system 500 as depicted in FIG. 5 or any other system and/or device.

In operation 110, information for a source user may be received by, for example, system 500. Information for a user (e.g., a user signature) may include, for example, at least one topic and a user value (e.g., a value) for each topic.

Topics may be, for example, categories, abstract ideas, subjects, things, and/or concepts representing content or subject matter of a file (e.g., a audio file, video file, spreadsheet, word processing file, text file, or another type of files). Topics may be, for example, an abstract notion of what a file (e.g., a document) pertains to, is related to, and/or is about. A topic may, in some aspects, be a concept that at least a portion of the file (e.g., document) is about. A topic may or may not be a term present in a document text but may be, for example, associated with one or more terms present in a document and may be generated by natural language processing or other processes based on one or more terms in a document and/or other information. For example, a file (e.g., a document) may include information (e.g., text) about cars, planes, and boats, all of which appear as terms verbatim in the file. More abstractly, however, it may be determined that the file is about "vehicles" and "modes of transportation." Topics associated with the document may, therefore, be "vehicles," "modes of transportation," and/or other topics.

A user value may, for example, represent how strongly a user is associated with a topic. A user may be associated with a topic by, for example, interacting with files, documents, web pages, information, and/or data related to and/or including that topic. A user may interact with a file, document, web page, information and/or data related to a topic by adding, removing, editing, viewing, and/or otherwise interacting with information in a file including a topic (e.g., an audio file, video file, spreadsheet, word processing file, text file, or another type of files). A user may, for example, interact with a topic in a document by adding, removing, editing, and/or otherwise altering document content related to a topic. A user may also interact with a topic by viewing, opening, subscribing to, tagging, starring, sharing, and/or otherwise interacting with a file or other data that includes text and/or content related to a topic.

Files as discussed herein may include documents, document text, video files, audio files, computer code, and/or any other type of file. Document text may be, for example, a text-based representation of a document. A document may include text (e.g., a word processing document, text file, portable document format (pdf), spreadsheet, or presentation) or may have text associated therewith, such as in a transcript, when the document is a video (e.g., a web-based video, digital video file, or any other type of video), an audio file (e.g., an audio recording, podcast, or any type of audio), and/or another type of electronically stored file. A document may, in some aspects, be a web-page, computer instructions (e.g., computer code in any language), and/or any other internet and/or computer related file. In that case, the document text file may be linked to and/or stored with the document and/or may be stored separately. It will be understood that operations involving the text of a document may be performed on or with the document or the document text file depending on the location of text.

In some aspects, information for a source user (e.g., including at least one topic and a user value for each topic) may be received from an automatic process operating on data associated with the source user. An automatic process operating on data associated with a user may, for example, be a process, method and/or approach using natural language processing (NLP), user topic interest computation, user topic authority computation, and/or other approaches to determine user association with one or more topics. An automatic process for determining user topic authority may, for example, be used to generate for a user one or more topics and a user authority value for each topic representing a level, amount, or strength of a user's expertise or authority in a topic. An automatic process for determining user topic interest may, for example, be used to generate for a user one or more topics and a user interest value for each topic representing a level, amount, or strength of a user's interest in a topic.

In some aspects, a user value may include a user authority value. A user authority value may be a user authority signature value (e.g., authority signature value) as discussed in patent application Ser. No. 13/363,210, filed Jan. 31, 2012 for "SYSTEM AND METHOD FOR DETERMINING TOPIC AUTHORITY," which is incorporated herein by reference. A user authority value may, for example, represent a user's expertise related to a topic. A user authority value (e.g., user authority signature value) may, for example, be generated based on authorship information for a user for one or more files (e.g., documents), weights of topics in the one or more files, and/or other information. Authorship information of a user may include for each of one or more topic(s) in or associated with a file an authorship, contribution, and/or creation percentage for that user. An authorship percentage may, for example, represent a portion, amount, or quantity of a topic authored, generated, and/or created by an author. Authorship information may be determined based on a user's and/or author's interaction with at least a portion of a document related to a topic (e.g., text a user adds to, edits a user makes in, and/or other types of user interaction with a document). A user authority value may be, for example, a sum of products of one or more authorship percentages for a document and a weight of a topic in that document.

In some aspects, a user value may include a user interest value. A user interest value may be a user interest signature value (e.g., an interest signature value) as discussed in patent application Ser. No. 13/363,169, filed Jan. 31, 2012 for "SYSTEM AND METHOD FOR DETERMINING TOPIC INTEREST," which is incorporated herein by reference. A user interest value may, for example, represent a degree, amount, magnitude, and/or strength of a user's interest in and/or association with a topic. A user interest value may, for example, be a sum of products of one or more values representing user interest in a file (e.g., a document) and a weight of a topic in that file (e.g., document). A value representing user interest in a file may, for example, represent a degree, magnitude, and/or strength of a user's interest in a file (e.g., a document). A value representing a user's interest in a file may, for example, be calculated based on document interaction characteristics, document access characteristics, document editing characteristics, and/or document sharing characteristics. A product of a value representing a user's interest in a file and a weight of a topic in that file may represent and/or quantify a user's interest in that topic in that file. One or more products of values representing a user's interest in a file and a weight of a topic in that file for one or more files may be summed to generate an interest value of a topic for a user.

A user value may, in some aspects, represent a confidence of association of a topic to a user. A user value (e.g., corresponding to a topic) may represent a confidence, certainty, and/or likelihood that a user is associated with a topic. For example, a user value (e.g., 0.70) may indicate a confidence of 70% that a user is related to a topic (e.g., the first user is interested in the first topic, has authority on the first topic, or is otherwise associated with the topic).

In some aspects, information for a source user may be received from a user. Information for a source user may include at least one topic and a user value for each topic for the source user. Information for a source user may be received from, for example, the source user or any other user. Information may be received from a user (e.g., a source user or any other user) by way of, for example, a component or device associated with system 500. For example, a user may wish to identify or determine similar users (e.g., among a set of users), and the user may input information including at least one topic and user value for each topic. The topics (e.g., at least one topic) and user value for each topic may be used to select one or more users similar to that user.

In operation 120, similarity scores between a source user and a set of users (e.g., one or more users in a set of users) may be generated. Similarity scores may be generated based on, for example, a user value for each topic (e.g., a user interest value, a user authority value) for the source user and a user value for the same topic for each user in a set of users. Each user in a set of users may, for example, be associated with a user value for each topic. A user value (e.g., a user interest value, a user authority value) may be, for example, a number, percentage, scalar, and/or other type of value. One or more user values for a user (e.g., values for a user) may, for example, be included in a vector, array, matrix, table, and/or any other type of data structure.

In some aspects, one or more user values for a user (e.g., each user value for a topic for that user) may be normalized, scaled, or interpolated to generate normalized user values for each topic. User values for each topic may be normalized such that all normalized user values for a user sum to 1.0, 100%, and/or any other value. Normalized user values may be computed or generated by, for example, dividing each user value for a topic by a sum of all user values across all topics for a user (e.g., over all topics for a user).

A similarity score between a source user and a first user may be, for example, equal to a sum of products of user values for the source user and user values for the first user. Each product in the sum of products may be a product of a user value for a topic for the source user and a user value for the same topic for the first user.

Similarity scores between a source user and one or more users in a set of users may be generated. A set of users may include, for example, one or more users associated with a group, organization, circle, collection, social network, and/or other set of users. A source user may, in some aspects, be included in or be a member of one or more sets of users. Each user in a set of users may be associated with a user value (e.g., including at least one topic and a user value for each topic).

A user value (e.g., a user authority value, a user interest value) for a source user may, for example, be compared to user values for each of one or more users in a set of users. Each comparison may be between two users (e.g., a source user and a user in a set of users). In comparing user values, a user value for a topic associated with a source user may be compared to a user value for the same topic for each user within a set of users. Similarity scores may be generated based on the comparison (e.g., one similarity score may be computed for each pair-wise user comparison between the source user and a user within the set of users). A process of generating similarity scores may be repeated for each topic associated with a source user.

In some aspects, a similarity score may be generated by computing a sum of products of user values, a cosine similarity of user values, or using other mathematical approaches. A similarity score may be generated by computing a sum of products of user values for a source user and respective user values associated with a user within a set of users. For example, a similarity score between a source user and a user within a set of users may be computed by multiplying a user value for a topic for the source user by a user value for the same topic for each user within the set of users. The process may be repeated for each user value for each user (e.g., among the set of users).

In some aspects, a particular user value for a topic for a user may be zero, if the user has not interacted with (e.g., viewed, edited, drafted, and/or otherwise interacted with) any documents including that topic. A similarity score may be a sum of products of user value—user value product terms (e.g., a user value for a first user multiplied by a user value for the same topic for a second user). In an example where a user value for a topic for a first user is zero, a similarity score product term between a user value for a topic for the first user of zero (e.g., 0.0) and a user value for the same topic for a second user may be zero (e.g., 0.0) indicating no similarity between the two users with respect to that topic. Similarly, if all product terms (e.g., user value—user value product terms) in a similarity are equal to zero, then the similarity score may be equal to zero.

In some aspects, similarity scores may be generated by computing or calculating a cosine similarity of user values for each topic associated with a source user. A cosine similarity value, score, or parameter may be a quantity representing how similar a vector representing user values associated with a first user is to a vector representing user values associated with a second user. A cosine similarity score may be, for example, a number between 0.0 and 1.0, a percentage, any range of numbers, and/or value(s). A cosine similarity, Sim (S,U), may be calculated using an equation such as:

$$Sim(S, U) = \cosine\theta = \frac{S \cdot U}{\|S\|\|U\|}$$

A cosine similarity, Sim(S,U) may, for example, be calculated based on a vector representing user values, S for a source user and a vector representing user values for a user in a set of users, U. A cosine similarity score may be, for example, a normalized dot product of a vector representing user values for a source user, S and a vector representing user values for a user included in a set of users, U. A vector representing user values for a source user, S may include user values for each topic associated with a source user. A vector representing user values for a user within a set of users, U may include user values for each topic for that user. If a user (e.g., a source user or a user in a set of users) has not interacted with a topic, a user value of zero may be assigned to that topic in a vector representing user values for that user.

A dot product or sum of products may be normalized by dividing the dot product by a product of a norm of a vector representing user values associated with a source user, ‖S‖ and a norm of a vector representing user values associated with a user in a set of users, ‖U‖. A vector norm may, for example, be a length and/or magnitude of a vector (e.g., Euclidian distance of a vector). Normalizing the dot product may, for example, ensure that each similarity score (e.g., cosine similarity score) is between 0 and 1 or another range.

As shown in the following table, a similarity score may be generated between a source user and user Y (e.g., a user in a set of users). A similarity score (e.g., a cosine similarity of user values) between a source user and user Y may be generating based on a vector representing user values associated with a source user (e.g., [0.2, 0.5, 0.3, 0, 0]) and a vector representing user values associated with user Y (e.g., [0, 0.6, 0.3, 0.1, 0]). In this example, user values for each topic for each user may be normalized user values. In some aspects, either user values, normalized user values, and/or otherwise transformed user values may be used to generate similarity scores.

Example Similarity Scores

| USER VALUES FOR SOURCE USER | USER VALUES FOR USER Y | SIMILARITY SCORE (BETWEEN SOURCE USER V · USER Y) |
|---|---|---|
| [0.2, 0.5, 0.3, 0, 0] | [0, 0.6, 0.3, 0.1, 0] | $\frac{[0.2, 0.5, 0.3, 0, 0] \cdot [0, 0.6, 0.3, 0.1, 0]}{\|[0.2, 0.5, 0.3, 0, 0]\|\|[0, 0.6, 0.3, 0.1, 0]\|} = 0.93$ |

A similarity score between a source user and user Y may be, for example, a cosine similarity of user values for each topic, which may be equal to 0.93. Similarity scores may also be generated between the source user and other users in a set of users using a similar approach.

In operation 130, similar users (e.g., one or more similar users) may be selected and output. One or more similar users may be selected based on generated similarity scores (e.g., similarity scores between a source user and each of one or more users in a set of users). Users may, for example, be ranked, grouped, and/or categorized based on similarity scores, and one or more users may be selected based on the ranking, grouping, and/or categorization.

In some aspects, one or more users associated with one or more highest generated similarity scores may be selected. For example, a highest ranked user in a set of users or a user associated with a highest similarity score may be selected. In some aspects, any number of highest ranked users (e.g., a top-N scoring and/or ranking users or a list of the top-N scoring and/or ranking users) may be selected. A number of users to be selected (e.g., a top N users) may be determined by, for example, a user, a system or device in system 500, and/or any other system or device.

According to some aspects, selecting one or more similar users may include comparing a similarity score for each user in a set of users (e.g., a similarity score between a source user and each user in a set of users) to a threshold similarity score and selecting one or more similar users based on the comparison. A threshold similarity score may be, for example, a predetermined threshold similarity score (e.g., a fixed threshold similarity score, a static threshold similarity score, a manual threshold similarity score), a varying threshold similarity score, or any other type of threshold similarity score. A predetermined threshold similarity score may be any similarity score generated by, for example a user, system 500, or another system and/or process. By way of example, one or more users associated with similarity scores above a threshold similarity score may be selected and/or may be deemed similar users. One or more similar users and/or selected users may be output to, for example, a user, a component of system 500, and/or any other system or device.

In some aspects, one or more users associated with similarity scores above an automatically determined threshold similarity score (e.g., a varying threshold similarity score) may be deemed similar users and may be selected. An automatically determined threshold similarity score may, for example, be computed based on one or more similarity scores, each similarity score between a source user and a user (e.g., in a set of users). An automatically determined threshold similarity score may, for example, be generated based on a distribution of similarity scores and may change as similarity score data is added, removed, and/or altered within the similarity score distribution.

In some aspects, an automatically determined threshold similarity score may be generated using, for example, an automatic threshold detection process or other approaches. In an automatic threshold detection process, a threshold may be determined based on a set of similarity score data (e.g., a distribution of similarity score data). An automatic threshold detection process may, for example, be a K-means, difference in means, hierarchical agglomerative clustering (e.g., bottom-up clustering), or similar approach in which similarity score data is divided into groups and/or clusters based on computed mean similarity score values for each group and/or cluster (e.g., average values, median values, etc.). An automatically determined threshold similarity score may, in some aspects, be a boundary between groups of similarity score data and may be determined to group similarity score data into one or more groups, each group including similarity score values within a minimized range of the other values in the group or an average of all values in the group. An automatically determined threshold similarity score may, therefore, be related to the similarity score data set and may vary as similarity score data is added, removed, and/or altered. Each of one or more users may be categorized into a group of users based on whether a similarity score associated with that user is above or below the one or more automatically determined threshold similarity scores.

By way of example, a set of similarity score data may include values of 0.0, 0.1, 0.6, 0.8, 0.85, and/or possibly other values. Based on the similarity score data, an automatically determined threshold may be generated to divide the data into, for example, two groups and/or clusters. An automatically determined threshold (e.g., computed by system 500) that divides the similarity score data into two groups may be, for example, 0.4. Similarity score values above 0.4 (e.g., 0.6, 0.8, and 0.85) may, for example, be assigned to one group, and similarity score values below 0.4 (e.g., 0.0 and 0.1) may be assigned to a second group. An automatically determined threshold of 0.4 may, for example, divide the values into two groups, and the values in each group may be within a minimized distance of an average value of the group. For example, an average of the first group values may be 0.75 (e.g., (0.6+ 0.8+0.85)/3) and each value in the first group may be within 0.15 of the average value (e.g., 0.75). Similarly, each value in the second group may be within 0.05 of the group average value (e.g., 0.05=(0.0+0.1)/2).

In some aspects, if a new user joins, is placed in, and/or is added to a set of users, a similarity score between the new user and a source user may be generated. As a result of the new similarity score, a data distribution of similarity scores associated with the source user (e.g., between the source user and each of one or more users in a set of users) may change. An automatically determined threshold similarity score that is determined based on similarity scores between a source user and each of one or more users in a set of users may, therefore, also vary as a result of changes to user(s) in a set of users. Similarly, an automatically determined threshold similarity score may be altered if users are removed from a set of users, user(s) values associated with one or more users in a set of users change, or based on other events or changes.

According to some aspects, similar users may include a cluster or group of users associated with best, high, or most favorable similarity scores. For example, a subset of users may be a predetermined number of users with best or most favorable similarity scores. Best or most favorable similarity scores may be, for example, similarity scores indicating a highest similarity between a source user and a user (e.g., within a set of users).

In some aspects, a number of similar users may be limited to a maximum predetermined number of users. A maximum predetermined number of users may be set by a user (e.g., in a settings dialog, panel, screen, menu, and/or other interface), may be automatically determined, or may be set by another system or device.

In some aspects, a source user may be a user in a set of users. Information may be received for the user (e.g., including at least one topic and a user value for each topic), similarity scores may be generated based on a value for each topic for the source user and a value for the same topic for each user in a set of users, and one or more similar users may be selected based on the generated similarity scores, and one or more similar users and/or selected users may be output. The steps (e.g., receiving information, generating similarity scores, selecting one or more similar users, and outputting one or more selected users) may be repeated for each user in a set of users.

In some aspects, each user in a set of users may be assigned to one or more groups of users based on generated similarity scores (e.g., between a source user and the each user in a set of users). One or more groups of users may, for example, be output to a user, system 500, and/or another device or system. Users may be categorized into groups (e.g., classes, categories, buckets, and/or bins of users) using, for example, an automatic grouping, clustering, or other approach. An automatic grouping, clustering, or other similar approach may be, for example, a K-means, difference in means, or other method or approach. In an automatic grouping approach, one or more varying threshold similarity scores may be generated, for example, using automatic threshold detection or another approach. A varying similarity score threshold may, for example, be calculated based on one or more user similarity scores (e.g., a user similarity score distribution). A varying threshold similarity score may, therefore, be related to the similarity score data distribution and may vary as similarity score data is added, removed, and/or altered. Each of one or more users may be categorized into a group of users based on whether a similarity score associated with that user is above or below the one or more threshold similarity scores.

By way of example, one or more users may be categorized, classified, and/or grouped into three or any other number of groups based on similarity scores. One or more users associated with similarity score values above a first threshold similarity score (e.g., a predetermined threshold similarity score or automatically determined threshold similarity score) may, for example, be categorized into a first group. Similarly, one or more users associated with similarity scores below the first threshold similarity score and above a second threshold similarity (e.g., a predetermined threshold similarity score or automatically determined threshold similarity score) score may be categorized into a second group. One or more users associated with similarity scores below the second threshold similarity score may be categorized into a third group of users. Any number of threshold similarity scores may be used to group users into any number of categories, groups, or sets of users.

In some aspects, a title for a group of users may be generated based on topics present in the information for one or more users in the group of users. For example, a group of user may include three users (e.g., user X, user Y, and user Z) or any other number of users. Information for user X may include three topics (e.g., topic A: airplanes, topic B: bicycles, and topic C: cars) and a user value for each topic (e.g., topic A user value, topic B user value, topic C user value). Information for user Y may include three topics (e.g., topic B: bicycles, topic C: cars, and topic D: driving) and a user value for each topic (e.g., topic B user value, topic C user value, topic D user value). Information for user Z may include three topics (e.g., topic B: bicycles, topic D: driving, and topic E: exercise) and a user value for each topic (e.g., topic B user value, topic D user value, topic E user value). Based on the information for each user (e.g., users X, Y, and Z), it may be determined that a title for the group of users should be topic B: bicycles or a title related to topic B: bicycles. Topic B: bicycles may be the title for the group of users because the information for user X, user Y, and user Z include topic B: bicycles. A title for the group of users may also be generated based on multiple topics in the information for user X, user Y, and/or user Z. A title for a group of users may, for example, be generated based on information (e.g., one or more topics and a user value for each topic) for one or more users in the group of users using a natural language processing (NLP) or a similar method or process.

In some aspects, the receiving, generating, selecting, and outputting steps may be initiated in response to a user selecting a source user. Operation 110, operation 120, and operation 130 may be performed in response to input from a user (e.g., a user selecting a source user), a trigger event, or in response to any other input. In response to a user selecting a source user, a trigger event, or any other action, information for a source user may be received, similarity scores between the source user and one or more users in a set of users may be generated, one or more similar users may be selected based on the generated similarity scores, and one or more similar users may be output. A trigger event may be, for example, an addition of a user to a set of users (e.g., addition of a source user), creation of a new user (e.g., addition of information for a new user), creation of a new set of users (e.g., a group of users), editing information for a user in a set of users, removal of a user from set of users, a change of information for a user in a set of users, or any other event or action, which may result in a change to a set of users or other information. A trigger event may, for example, occur at any time and may be the result of user input, other processes or systems, or other factors.

In some aspects, an identity of one or more similar users to a source user may be output in response to input from a user. A user providing input may be, for example, a source user or any other user. A user may, for example, enter an identity of a source user, input information for a source user (e.g., including at least one topic and a user value for each topic), and/or otherwise enter information related to a source user. Based on the information input from the user, similarity scores may be generated between the source user and one or more users, one or more similar users may be selected based on the similarity scores, and one or more similar users may be output. One or more similar users may be output to a user (e.g., using a component of system 500), to system 500, and/or to another system or device.

According to some aspects, a representation of one or more similar users may be output. A representation of similar users may be, for example, a graphical representation of similar users (e.g., a graphical model, graph, plot, table, bar graph, pie chart, or other graphical representation of similar users), a list of similar users (e.g., a list or table of similar users in a preview pane, window, or other displays), and/or any other type of data representation.

In some aspects, an identity of one or more overlapping topics and a value indicating a degree of overlap (e.g., topic overlap value) for each overlapping topic may be output. Overlapping topics (e.g., common topics, shared topics) may be, for example, topics associated with two or more users (e.g., both a first user, second user, and possibly other users). For example, information for user X may include three topics: topic A (e.g., airplanes), topic B (e.g., bicycles), and topic C (e.g., cars) and a user value for each topic: topic A user value (e.g., 0.2), topic B user value (e.g., 0.5), and topic C user value (e.g., 0.3). Information for user Y may include three topics topic B (e.g., bicycles), topic C (e.g., cars), and topic D (e.g., driving) and a user value for each topic B user value (e.g., 0.6), topic C user value, topic D user value). In this example, overlapping topics for the first user (e.g., user X) and the second user (e.g., user Y) may include topic B: bicycles and topic C: cars. A degree of overlap for each overlapping topic may be computed based on a similarity score between the first user and the second user for each topic. For example, a value representing a degree of overlap for topic B between the first user (e.g., user X) and the second user (e.g., user Y) may be equal to a product of a user value for topic B for user X (e.g., 0.5) and user value for topic B for user Y (e.g., 0.6), which may equal to 0.3. Similarly, a value representing a degree of overlap for topic C between the first user (e.g., user X) and the second user (e.g., user Y) may be equal to 0.09. The one or more overlapping topics (e.g., topic B and topic C) and a value indicating a degree overlap (e.g., topic B overlap value=0.3 and topic C overlap value=0.09) for each overlapping topic may be output.

In some aspects, one or more overlapping topics associated with one or more highest degrees of overlap may be output. For example, overlapping topics may be ranked in order of degree of overlap (e.g., in descending or ascending order of degree of overlap), and a highest ranked topic may be selected and output. In some aspects, any number of highest ranked topics (e.g., a list of top-N scoring topics) may be output. A number of overlapping topics to be selected and output may be determined by, for example, a user, a system or device in system 500, and/or any other system or device.

In some aspects, one or more overlapping topics associated with degrees of overlap above a threshold degree of overlap may be output. A threshold degree of overlap may be, for example, a predefined threshold degree of overlap (e.g., a fixed degree of overlap), an automatically determined threshold degree of overlap, or other type of threshold. A predetermined degree of overlap may be determined by, for example, a user, a system or device associated with system 500, and/or any other system or device. An automatically determined threshold similarity score may be generated, for example, using an automatic threshold detection process or other approaches. An automatically determined threshold degree of overlap may be used in a clustering method (e.g., K-means clustering, hierarchical agglomerative clustering, or another clustering algorithm) to group or cluster sets of topics based on degree of overlap. One or more topics in a group or cluster of topics may be output.

FIG. 2 shows a diagram 200 of user signatures according to aspects of the present disclosure. One or more user signatures (e.g., user X user signature 210, user Y user signature 220, and user Z user signature 230) may each include information for a user (e.g., user X, user Y, and user Z). Information for a user may include at least one topic, a user value for each topic, a normalized user value for each topic, and/or other information.

In this example, information and/or a user signature for user X 210 may include at least one topic 212 (e.g., three topics), a user value for each topic 214, and/or other information. In some aspects, user values for each topic 214 may be normalized to generated normalized user values for each topic 216. A user signature for user X 210 may include three topics 212: topic A, topic B, and topic C and a user value for each topic 214: topic A user value (e.g., 0.4), topic B user value (e.g., 1.0), and topic C user value (e.g., 0.6). Each user value for a topic may represent, for example, how strongly user X is associated with that topic.

In some aspects, user values for each topic may be normalized such that all normalized user values for a user sum to 1.0, 100%, and/or any other value. Normalized user values may be computed or generated by dividing each user value for a topic by a sum of all user values for each topic for a user. Normalized user values for user X 216 may include, for example, topic A normalized value (e.g., 0.2), topic B normalized value (e.g., 0.5), and topic C normalized value (e.g., 0.3). Normalized user values for user X 216 may be generated by dividing each user value (e.g., topic A user value, topic B user value, and topic C user value) by the sum of all user values (e.g., 2.0=topic A user value+topic B user value+topic C user value).

In this example, information and/or a user signature for user Y 220 may include at least one topic 222 (e.g., three topics), a user value for each topic 224, and/or other information. In some aspects, user values for each topic 224 may be normalized to generate normalized user values for each topic 226. A user signature for user Y 220 may include three topics 222: topic B, topic C, and topic D and a user value for each topic 224: topic B user value (e.g., 1.2), topic C user value (e.g., 0.6), and topic D user value (e.g., 0.2). Normalized user values for user Y 226 may include, for example, topic B normalized value (e.g., 0.6), topic C normalized value (e.g., 0.3), and topic D normalized value (e.g., 0.1).

In this example, information and/or a user signature for user Z 230 may include at least one topic 232 (e.g., three topics), a user value for each topic 234, and/or other information. In some aspects, user values for each topic 234 may be normalized to generate normalized user values for each topic 236. A user signature for user Z 230 may include three topics 232: topic B, topic D, and topic E and a user value for each topic 234: topic B user value (e.g., 1.25), topic D user value (e.g., 0.25), and topic E user value (e.g., 1.0). Normalized user values for user Z 236 may include, for example, topic B normalized value (e.g., 0.5), topic D normalized value (e.g., 0.1), and topic E normalized value (e.g., 0.4).

FIG. 3 shows a diagram 300 of similarity scores for a source user according to aspects of the present invention. Similarity scores may be generated based on a user value for each topic for a source user and a value for the same topic for each user in a set of users. Similarity scores may, for example, be generated by computing a cosine similarity of user values for each topic. A cosine similarity of user values for each topic may, for example, be calculated based on a vector including and/or representing user values for a source user and a vector including user values for a user in a set of users.

By way of example, similarity scores 310 may be generated between a source user (e.g., user X) and one or more users 320 (e.g., user Y and user Z) in a set of users. In this example, a source user may be user X, and the two users 320 in a set of users may be user Y and user Z (as discussed above in connection with FIG. 2). In this example, user values for each topic for each user may be normalized user values (e.g., user X normalized user values 216, user Y normalized user values 226, user Z normalized user values 236 as discussed above in connection with FIG. 2). In some aspects, either user values, normalized user values, and/or otherwise transformed user values may be used. User values for each topic for a source user (e.g., user X) may be, for example, a vector of user values (e.g., [0.2, 0.5, 0.3, 0.0, 0.0], where a user value for topic A is equal to 0.2, a user value for topic B is equal to 0.5, a user value for topic C is equal to 0.3, and user values topics D and E are equal to zero). User values for each topic for user Y may be, for example, be a vector of user values (e.g., [0.0, 0.6, 0.3, 0.1, 0.0]). User values for each topic for user Z may be, for example, be a vector of user values (e.g., [0.2, 0.05, 0.3, 0.0, 0.0]).

A similarity score 310 (e.g., a cosine similarity of user values) between a source user and user Y may be generated by computing and/or calculating a dot product of a vector representing user values for a source user (e.g., [0.2, 0.5, 0.3, 0.0, 0.0]) and a vector representing user values for user Y (e.g., [0.0, 0.6, 0.3, 0.1, 0.0]) and dividing the dot product by the product of the norm of the vector representing user values for a source user (e.g., ||[0.2, 0.5, 0.3, 0.0, 0.0]||) and the norm of the vector representing user values for a user Y (e.g., ||[0.0, 0.6, 0.3, 0.1, 0.0]||). A cosine similarity of user values between a source user and user Y may, in this example, be equal to 0.93 or another value.

A cosine similarity of user values may be computed by calculating a dot product of a vector representing user values for a source user (e.g., [0.2, 0.5, 0.3, 0.0, 0.0]) and a vector representing user values for user Z (e.g., [0.0, 0.05, 0.0, 0.1, 0.4]) and dividing the dot product by the product of the norm of the vector representing user values for the source user (e.g., ||[0.2, 0.5, 0.3, 0.0, 0.0]||) and the norm of the vector representing user values for user Z (e.g., ||[0, 0.5, 0.0, 0.1, 0.4]||). A cosine similarity of user values between a source user and user Z may, in this example, be equal to 0.63 or another value.

One or more similar users may be selected based on generated similarity scores (e.g., cosine similarity scores 310). In some aspects, one or more users associated with one or more highest similarity scores may be selected. In this example, a similarity score between a source user and user Y (e.g., 0.93) may be higher than a similarity score between the source user and user Z (e.g., 0.63). A ranked list of users 340 based on similarity scores may include, for example, user Y ranked above user Z. In one example, it may be specified that a highest ranked user should be selected and output, and user Y may, for example, be selected and output (e.g., to a user, system 500, or another system or device). In some aspects, any number of users (e.g., a top N users from a list and/or a subset including a top N users from a list) may be output (e.g., to a user, system 500, or another system or device). The column labeled "TOP N" 340 may indicate whether a similarity score for user (e.g., user Y, or user Z) is among the top N (e.g., in this example a top one and/or highest) similarity scores.

One or more similar users may be selected based on a threshold similarity score. A threshold similarity score may be, for example, a predetermined or fixed threshold similarity score 350, an automatically determined threshold similarity score 360, and/or any other type of threshold similarity score.

In this example, a predetermined threshold similarity score 350 may be equal to 0.5 or any other value. A similarity score between a source user and user Y (e.g., 0.93) may, for example, be higher than a predetermined threshold similarity score 350 (e.g., 0.5). Similarly, a similarity score between a source user and user Z (e.g., 0.63) may, for example, be higher than a predetermined threshold similarity score 350 (e.g., 0.5). In this example, user Y and user Z may, therefore, be deemed similar users and the identity of user Y and user Z may be output (e.g., for display to a user or to system 500). The column labeled "FIXED (E.G., 0.5)" 350 may indicate whether a similarity score for a user (e.g., user Y, or user Z) is above a predefined threshold (e.g., 0.5).

By way of example, an automatically determined threshold similarity score 360 may be equal to 0.75 or any other value. A similarity score between a source user and user Y (e.g., 0.93) may, for example, be higher than an automatically determined threshold similarity score 360 (e.g., 0.75 or any other threshold similarity score). User Y may, therefore, be deemed a similar user and the identity of user Y may be output (e.g., for display to a user or to system 500). A similarity score (e.g., a cosine similarity score) between a source user and user Z (e.g., 0.63) may, for example, be lower than a automatically determined threshold similarity score 360 (e.g., 0.75 or any other threshold similarity score). In this example, user Z may be deemed a not similar user and the identity of user Z may not be output. The column labeled "AUTO (E.G., 0.75)" 360 may indicate whether a similarity score for user (e.g., user X, user Y, or user Z) is above an automatically determined threshold (e.g., 0.75).

FIG. 4 shows a diagram 400 depicting topic overlap according to aspects of the present invention. According to some aspects, an identity of one or more overlapping topics and a value indicating a degree of overlap (e.g., topic overlap value) for each overlapping topic may be output. Overlapping topics (e.g., common topics, shared topics) may be, for example, topics associated with two or more users (e.g., both a source user and user Y and/or user Z).

In this example, a value representing a degree of overlap 420 for each overlapping topic 410 between a source user (e.g., user X) and user Y may be generated. Information for a user and/or a pair of users (e.g., a source user and user Y) may be the user information as discussed above in connection with FIG. 2 and FIG. 3. Information for a source user may include, for example, three topics: topic A, topic B, and topic C and a user value for each topic: topic A user value (e.g., 0.2), topic B user value (e.g., 0.5), and topic C user value (e.g., 0.3). Information for user Y may include three topics (e.g., topic B, topic C, and topic D) and a user value for each topic: topic B user value (e.g., 0.6), topic C user value (e.g., 0.3), topic D user value (e.g., 0.1). In this example, overlapping topics 410 between the source user (e.g., user X) and user Y may include topic B and topic C. A degree of overlap for each overlapping topic 420 may be computed based on a similarity score between the source user and user Y for each topic and/or a product of user values for a topic for the source user and user Y. For example, a value representing a degree of overlap for topic B between the source user (e.g., user X) and user Y may be equal to a product of a user value for topic B for the source user (e.g., 0.5) and user value for topic B for user Y (e.g., 0.6), which may equal to 0.3. Similarly, a value representing a degree of overlap for topic C between the source user and user Y may be equal to 0.09. A degree of overlap for topics A, D, and E may be zero (e.g., 0) indicating that topics A, D, and E are not overlapping topics. The one or more overlapping topics 410 (e.g., topic B and topic C) and a value indicating a degree of overlap 420 (e.g., topic B overlap value=0.3 and topic C overlap value=0.09) for each overlapping topic may be output.

In some aspects, one or more overlapping topics associated with one or more highest degrees of overlap 430 may be output. Overlapping topics may, for example, be ranked in order of degree of overlap 420 (e.g., in descending or ascending order of degree of overlap), and a highest ranked one or more topics may be selected and output. In some aspects, any number of highest ranked topics (e.g., a list of top-N scoring topics) may be output. The column labeled "TOP N" 430 may indicate whether a degree of overlap for a topic (e.g., topic A, topic B, topic D, or topic E) is among the top N (e.g., in this example a top one and/or highest) degree of overlap values. In this example, a highest ranked overlapping topic between a source user and user Y may be topic B because topic B is associated with a highest degree of overlap 420 equal to 0.3. An identity of topic B may, therefore, be output.

In some aspects, one or more overlapping topics associated with degrees of overlap above a threshold degree of overlap may be output. A threshold degree of overlap may be, for example, a predefined or fixed threshold degree of overlap 440 (e.g., a fixed degree of overlap), an automatically determined threshold degree of overlap 450, or other type of threshold. A fixed threshold degree of overlap 440 may be determined by, for example, a user, a system or device associated with system 500, and/or any other system or device. An automatically determined threshold degree of overlap may be generated, for example, using an automatic threshold detection process or other approaches.

In this example, a predetermined or fixed threshold degree of overlap 440 may be equal to 0.25 or any other value. The column labeled "FIXED (E.G., 0.25)" 440 may indicate whether a degree of overlap for a topic (e.g., topic A, topic B, topic D, or topic E) is above a predefined degree of overlap threshold (e.g., 0.25). A degree of overlap for topic B between a source user and user Y may be equal to 0.3, which is greater than the predetermined threshold degree of overlap 440 of 0.25. The identity of topic B may, therefore, be output to, for example, a user, system 500, or any other system or device. A degree of overlap for topic C between a source user and user Y may be equal to 0.09, which is less than the predetermined threshold degree of overlap 440 of 0.25. Topic C may, therefore, not be output.

In this example, an automatically determined threshold degree of overlap 450 may be equal to 0.05 or any other value. The column labeled "AUTOMATIC (E.G., 0.05)" 450 may indicate whether a degree of overlap for a topic (e.g., topic A, topic B, topic D, or topic E) is above an automatically determined degree of overlap threshold (e.g., 0.05). A degree of overlap for topic B between a source user and user Y may be equal to 0.3, which is greater than the automatically determined threshold degree of overlap 450 of 0.05. A degree of overlap for topic C between a source user and user Y may be equal to 0.09, which is greater than the predetermined threshold degree of overlap 440 of 0.05. Topic B and topic C may, therefore, be output to, for example, a user, system 500, or any other system or device.

FIG. 5 shows an illustrative computer system 500 suitable for implementing methods and systems according to an aspect of the present disclosure. The computer system may comprise, for example, a computer running any of a number of operating systems. The above-described methods of the present disclosure may be implemented on the computer system 500 as stored program control instructions.

Computer system 500 includes processor 510, memory 520, storage device 530, and input/output structure 540. One or more input/output devices may include a display 545. One or more busses 550 typically interconnect the components, 510, 520, 530, and 540. Processor 510 may be a single or multi core.

Processor 510 executes instructions in which aspects of the present disclosure may comprise steps described in one or more of the Figures. Such instructions may be stored in memory 520 or storage device 530. Data and/or information may be received and output using one or more input/output devices.

Memory 520 may store data and may be a computer-readable medium, such as volatile or non-volatile memory, or any transitory or non-transitory storage medium. Storage device 530 may provide storage for system 500 including for example, the previously described methods. In various aspects, storage device 530 may be a flash memory device, a disk drive, an optical disk device, or a tape device employing magnetic, optical, or other recording technologies.

Input/output structures 540 may provide input/output operations for system 500. Input/output devices utilizing these structures may include, for example, keyboards, displays 545, pointing devices, and microphones—among others. As shown and may be readily appreciated by those skilled in the art, computer system 500 for use with the present disclosure may be implemented in a desktop computer package 560, a laptop computer 570, a hand-held computer, for example a tablet computer, personal digital assistant, mobile device, or smartphone 580, or one or more server computers that may advantageously comprise a "cloud" computer 590.

The systems and methods discussed herein and implemented using, for example, system 500, may be used to compute information and data related to billions of individual documents associated with millions of individual users in real-time. Individual users, for example, may each store, edit, modify, and otherwise manipulate thousands of documents. In some aspects of the present disclosure, generation, calculation, computation, determination and other methods and system operations discussed herein may be completed in parallel, simultaneously or in real-time for millions of individual users worldwide and/or globally.

At this point, while we have discussed and described the disclosure using some specific examples, those skilled in the art will recognize that our teachings are not so limited. Accordingly, the disclosure should be only limited by the scope of the claims attached hereto.

The invention claimed is:
1. A computer-implemented method for determining similar users, comprising:
receiving information for a source user, at a computer system, the information including at least one topic and a user value for each topic, where:

the user value includes a user authority value representing a user expertise related to that topic and a user interest value representing a degree of user association with that topic, and the user value represents how strongly the user is associated with that topic;

generating similarity scores based on a user value for each topic for the source user and a user value for the same topic for each user in a set of users, where each user in the set of users is associated with a user value for each topic;

selecting one or more similar users based on the generated similarity scores;

outputting one or more of the selected users; and outputting the identity of one or more overlapping topics and a value indicating a degree of overlap for each overlapping topic.

2. The method of claim 1, wherein the step of generating includes computing a cosine similarity of user values for each topic.

3. The method of claim 1, wherein the outputting the selected users step comprises:

outputting, in response to input from a user, an identity of one or more of the selected users.

4. The method of claim 1, wherein the outputting the selected users step comprises:

outputting a graphical representation of the one or more of the selected users.

5. The method of claim 1, wherein the selecting step comprises selecting one or more similar users associated with one or more highest generated similarity scores.

6. The method of claim 1, wherein the one or more similar users are selected based on a predetermined threshold similarity score.

7. The method of claim 1, wherein the one or more similar users are selected based on an automatically determined threshold similarity score.

8. The method of claim 7, wherein the automatically determined threshold similarity score is determined using an automatic threshold detection process.

9. The method of claim 1, wherein the receiving step comprises:

receiving the user information for the source user from a user.

10. The method of claim 1, wherein the receiving step comprises:

receiving the user information from an automatic process operating on data associated with the source user.

11. The method of claim 1, wherein all the steps are repeated for each user in a set of users.

12. The method of claim 11, further comprising:

outputting one or more groups of users, where each user in the set of users is assigned to a group based on the generated similarity scores.

13. The method of claim 12, further comprising:

outputting a title for one or more of the groups of users based on topics in information for one or more users in the group.

14. The method of claim 1, wherein the outputting overlapping topics step comprises:

outputting the identity of one or more overlapping topics associated with one or more highest degrees of overlap.

15. The method of claim 1, wherein the one or more overlapping topics are selected based on a degree of overlap being above a predetermined threshold degree of overlap.

16. The method of claim 1, wherein the one or more overlapping topics are selected based on a degree of overlap being above an automatically determined threshold degree of overlap.

17. A computer-implemented system for determining similar users comprising:

a non-transitory memory; and said system operable to:

receive information for a source user, the information including at least one topic and a user value for each topic, where:

the user value represents how strongly the user is associated with that topic, and the user value includes a user authority value representing a user expertise related to that topic and a user interest value representing a degree of user association with that topic;

generate similarity scores based on a user value for each topic for the source user and a user value for the same topic for each user in a set of users, where each user in the set of users is associated with a user value for each topic;

select one or more similar users based on the generated similarity scores;

output one or more of the selected users; and output the identity of one or more overlapping topics and a value indicating a degree of overlap for each overlapping topic.

18. The method of claim 17, wherein to generate similarity scores, said system is to compute a cosine similarity of user values for each topic.

19. A computer storage medium having computer executable instructions which when executed by a computer cause the computer to perform operations comprising:

receiving information for a source user, the information including at least one topic and a user value for each topic, where:

the user value represents how strongly the user is associated with that topic, and the user value includes a user authority value representing a user expertise related to that topic and a user interest value representing a degree of user association with that topic;

generating similarity scores based on a user value for each topic for the source user and a user value for the same topic for each user in a set of users, where each user in the set of users is associated with a user value for each topic;

selecting one or more similar users based on the generated similarity scores;

outputting one or more of the selected users; and outputting the identity of one or more overlapping topics and a value indicating a degree of overlap for each overlapping topic.

20. The computer storage medium of claim 19, which further causes the computer to perform a further operation comprising:

outputting, in response to input from a user, an identity of one or more of the selected users.

* * * * *